United States Patent
Tan et al.

(10) Patent No.: US 7,215,848 B2
(45) Date of Patent: May 8, 2007

(54) OPTICAL ISOLATOR UTILIZING A MICRO-RESONATOR

(75) Inventors: Michael R. T. Tan, Menlo Park, CA (US); William Trutna, Atherton, CA (US); David P. Bour, Cupertino, CA (US); Michael H. Leary, Mountain View, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 8 days.

(21) Appl. No.: 10/768,858

(22) Filed: Jan. 29, 2004

(65) Prior Publication Data

US 2005/0169582 A1 Aug. 4, 2005

(51) Int. Cl.
*G02B 6/26* (2006.01)
(52) U.S. Cl. .......................... 385/32; 385/15; 385/31; 385/42
(58) Field of Classification Search ............ 385/15–24, 385/31, 32, 39–42
See application file for complete search history.

(56) References Cited

U.S. PATENT DOCUMENTS

| | | | | |
|---|---|---|---|---|
| 5,018,857 | A | * | 5/1991 | Sanders et al. ............ 356/461 |
| 5,537,671 | A | * | 7/1996 | Toyama et al. ............. 385/27 |
| 6,101,300 | A | * | 8/2000 | Fan et al. ................... 385/27 |
| 6,411,752 | B1 | * | 6/2002 | Little et al. ................. 385/17 |
| 6,701,033 | B2 | * | 3/2004 | Okayama .................... 385/16 |
| 2002/0172466 | A1 | | 11/2002 | Baumannet et al. |
| 2003/0147579 | A1 | | 8/2003 | Hammer |
| 2004/0223719 | A1 | * | 11/2004 | Ram et al. ................. 385/144 |
| 2005/0058396 | A1 | * | 3/2005 | Tormen et al. .............. 385/39 |

FOREIGN PATENT DOCUMENTS

EP 1391972 2/2004

OTHER PUBLICATIONS

Stadler, B. J. et al., "Investigations of the Faraday Effect in Fe-Doped InP", IEEE, Apr. 21, 1996, pp. 569-571.

Djordjev, K. et al., "High-Q Vertically Coupled InP Microdisk Resonators" IEEE Photonics Technology Letter Mar. 2002, pp. 331-333.

(Continued)

*Primary Examiner*—Michelle Connelly-Cushwa (57) ABSTRACT

An optical isolator for coupling light from a first waveguide to a second waveguide is disclosed. The optical isolator utilizes a resonator coupled to the first and second optical waveguides. The resonator has a resonance at $\lambda$ for light traveling from the first optical waveguide to the second optical waveguide; however, the resonator does not have a resonance at $\lambda$ for light traveling from the second waveguide to the first waveguide. The resonator can use a layer of ferromagnetic material in an applied magnetic field. The magnetic field within the ferromagnetic material varies in strength and/or direction over the layer of ferromagnetic material. The magnetic field can be generated by an external magnetic field that varies over the layer of ferromagnetic material. Alternatively, the resonator can include a layer of ferromagnetic metal that overlies a portion of the layer of ferromagnetic material and a constant external magnetic field.

13 Claims, 6 Drawing Sheets

OTHER PUBLICATIONS

Hammer, Jacob M. et al. "Polycrystalline-Metal-Ferromagnetic Optical Waveguide Isolator . . . " IEEE Photonics Technology Letters, vol. 9, No. 5, May 1, 1997, pp. 631-633.

Seung, June Choi et al., "8-Channel Tunable MUX/DEMUX using Vertically Coupled Active Microdisk Resonators" IEEE Lasers & Electro-Optics Society, Oct. 27-28, 2003, vol. 1, pp. 287-288.

Djorvev, K. et al., "Active Semiconductor Microdisk Switching Devices Utilizing Gain and Electroabsorption Effects", Optical Fiber Communication COnference, vol. 70, pp. 811-813, OFC 2002.

Ma, Y et al. "Improved Optical Filter Responses in Cascaded InGaAsP/InP Microdisk Resonatos" Electronics Letters, vol. 37, No. 9, pp. 564-565, Apr. 26, 2001.

* cited by examiner

OPTICAL ISOLATOR UTILIZING A MICRO-RESONATOR

FIELD OF THE INVENTION

The present invention relates to integrated optical components, and more particularly, to optical isolators.

BACKGROUND OF THE INVENTION

The ever-increasing demand for broadband communication systems has led to optical transmission systems based on optical waveguides such as fiber optics and optical processing elements for use in these systems. To decrease the cost of such systems, large-scale integration of the optical devices is needed. Large-scale integration also provides decreased size and increased reliability.

One optical device that is used in such systems is an optical isolator. In optical communication systems, optical signals pass through interfaces that generate reflected signals that propagate back to the signal source. Optical isolators are used to block these reflected signals from reaching the source. Ideally, optical isolators transmit the optical signal in the forward direction and block the reflected light signal that is traveling in the reverse direction.

Optical isolators based on birefringent crystals, polarizers, and Faraday rotators are well known in the optical signal arts. Isolators based on Faraday rotators operate by rotating the polarization of the light in a direction that depends on the direction of travel of the light relative to the direction of an applied magnetic field. The amount of rotation θ experienced by the input plane of polarization is proportional to the length, L, of the Faraday medium, the magneto-optic or "Verdet" coefficient, V, of the medium and the strength of the applied magnetic field, H.

$$\theta = VHL$$

The simplest devices operate on linearly polarized light and consist of two polarization filters and a Faraday rotator that is located between the polarization filters. Light entering the device in the "pass direction" has a polarization that is aligned to pass through the first polarization filter. The Faraday rotator causes the direction of polarization of this light to be rotated by the Faraday rotator such that it will pass through the second polarization filter without being blocked. The polarization of any light traveling in the reverse direction that passes through the second polarization is rotated by the Faraday rotator to a direction that is blocked by the first polarization filter.

The above described isolator assumes that the light is linearly polarized in a direction that matches the pass direction of the first polarization filter. If the incident light is not linearly polarized, the light must be first split into two linearly polarized components and two isolators are used, one per component. If the light leaving the isolator is to have the same polarization as that entering the isolator, quarter waveplates must be included to rotate the light to the original polarization direction.

Such devices are relatively large and expensive, and hence, poorly suited for use in large-scale optical signal processing systems. In particular, the thickness of the Faraday rotator cannot be reduced, since the amount of rotation per unit length of material in the rotator depends on the physical properties of the materials used. Hence, there is a minimum thickness for the Faraday rotator and any quarter waveplates. These devices are typically of the order of 1 mm thick, which is large by integrated circuit standards. In addition, integration of these optical isolators with waveguides and other processing optical elements that are formed on a common substrate is difficult with these designs.

SUMMARY OF THE INVENTION

The present invention includes an optical isolator for coupling light from a first optical waveguide to a second optical waveguide. The optical isolator utilizes a resonator coupled to the first and second optical waveguides. The resonator has a resonance at wavelength λ for light traveling from the first optical waveguide to the second optical waveguide; however, the resonator does not have a resonance at λ for light traveling from the second optical waveguide to the first optical waveguide. In one embodiment, the resonator includes a layer of ferromagnetic material in an applied magnetic field. The magnetic field within the ferromagnetic material varies in strength and/or direction over the layer of ferromagnetic material. The magnetic field can be generated by an external magnetic field that varies over the layer of ferromagnetic material. In one embodiment, the resonator includes a layer of ferromagnetic metal that overlies a portion of the resonator. In this embodiment, a constant external magnetic field can be utilized. In another embodiment, the first waveguide and the second waveguide are located in a planar substrate, and the resonator overlies the first and second waveguides and is vertically coupled to the first and second waveguides.

DETAILED DESCRIPTION OF THE PREFERRED EMBODIMENTS OF THE INVENTION

Figure 1:
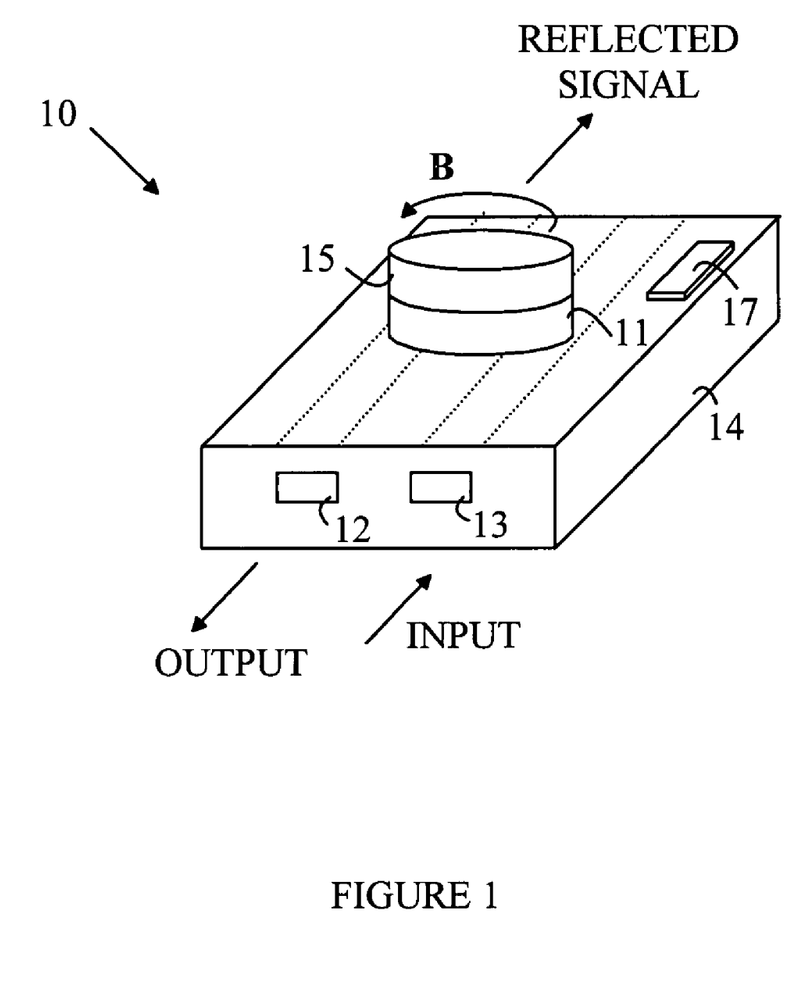
FIG. 1 is a perspective view of an optical isolator according to one embodiment of the present invention.

The manner in which the present invention provides its advantages can be more easily understood with reference to FIG. 1, which is a perspective view of an optical isolator according to one embodiment of the present invention. Optical isolator 10 is based on a microdisk resonator and operates in a manner similar to a wavelength routing switch. Optical isolator 10 includes first and second waveguides constructed in a substrate 14 and a microdisk resonator optimally coupled to the waveguides. The waveguides are shown at 12 and 13, and the resonator is shown at 11.

Microdisk resonator 11 will couple energy from waveguide 13 to waveguide 12 only if the wavelength of the optical signal propagating in the input waveguide matches one of the resonant wavelengths of the traveling wave mode in microdisk resonator 11. At resonance, complete energy transfer occurs between the input and output waveguides. The passband bandwidth of the isolator is determined by the coupling coefficient between the waveguide and the resonator and the loss in the resonator.

The resonant wavelengths of the disk resonator are given by $$\lambda_0 = \frac{2\pi d n_e}{m}$$

where $n_e$ is the effective index of the mode in microdisk resonator 11, d is the diameter of microdisk resonator 11 and m is an integer value. The free spectral range of the resonator modes is given by $$FSR = \frac{\lambda^2}{2\pi d n_e}\left[1 + \frac{\lambda}{n_e}\frac{dn_e}{d\lambda}\right]^{-1}$$

where c is the speed of light and d is the radius of the microdisk resonator.

In the arrangement shown in FIG. 1, a light signal entering input waveguide 13 will traverse the microdisk resonator in the counterclockwise direction and exit via output waveguide 12. A light signal traveling in the wrong direction, i.e., entering output waveguide 12, will traverse the microdisk resonator in the clockwise direction. This light signal must be blocked from re-entering the input waveguide 13.

To provide the isolation function, the microdisk resonator is constructed such that the index of refraction for light traveling in the counterclockwise direction of travel around microdisk resonator 11 is different from the index of refraction for light traveling in the clockwise direction. Hence, the resonant wavelength of microdisk resonator 11 for light traveling in the clockwise direction will be different than the resonant wavelength for light traveling in the counter clockwise direction. Assume that the microdisk resonator is constructed to have a resonance for light entering the input waveguide 13 and traversing the microdisk resonator in the counterclockwise direction. This light will be transferred to the output waveguide 12. Light of the same wavelength entering waveguide 12 will traverse the microdisk resonator in the clockwise direction. Since the index of refraction in the clockwise direction is different from that in the counter clockwise direction, this light will not be at a resonance of the microdisk resonator. Accordingly, the light entering the output waveguide 12 will not be transferred to waveguide 13. This light will merely exit the isolator at the other end of waveguide 12.

This asymmetry in the index of refraction experienced by light traveling in the different directions around the microdisk is accomplished by providing a layer 15 of ferromagnetic material such as iron-doped Indium Phosphide, Fe:InP, as part of the microdisk material and applying a magnetic field B to this layer. The refractive index of the ferromagnetic material in the microdisk resonator is a function of the applied magnetic field at each location around the microdisk. The light traveling in a direction parallel to the magnetic field will experience a different index of refraction than the light traveling in the opposite direction.

Figure 2:
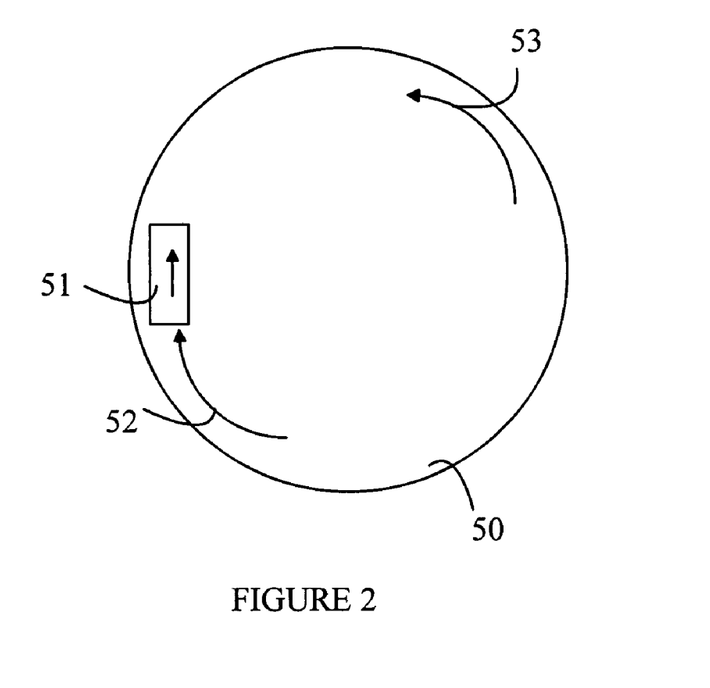
FIG. 2 is a top view of a microdisk resonator that includes a ferromagnetic material.

Refer now to FIG. 2, which is a top view of a microdisk resonator 50 that includes a ferromagnetic material as described above and which has an applied magnetic field limited to region 51 in the direction shown by the arrow in region 51. To simplify the following discussion, assume that the magnetic field is limited to a region 51. For the purposes of this discussion, assume that the index of refraction in the portion of the microdisk outside of region 51 is n, and the presence of the magnetic field changes the index to n+Δn if the light is traveling in the same direction as the arrow in region 51, and n−Δn if the light is traveling in the opposite direction in region 51. The light traveling in the clockwise direction as shown at 52 will experience an index of refraction that is higher than light traveling in the counterclockwise direction as shown at 53.

Figure 3:
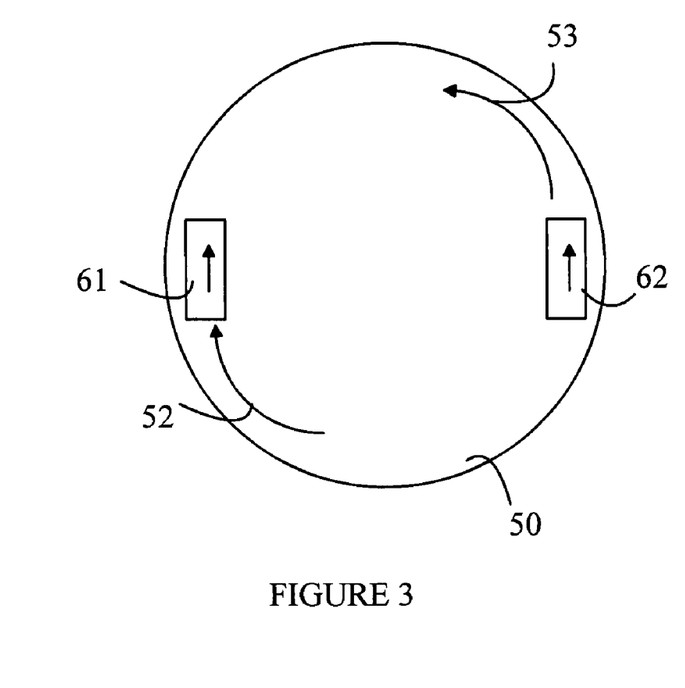
FIG. 3 is a top view of the microdisk resonator shown in FIG. 2 in a uniform magnetic field.

It should be noted that if the magnetic field were uniformly applied to the entire disk, no difference in the average index of refraction for the two directions of light travel would result. Refer to FIG. 3, which is a top view of microdisk resonator 50 in a uniform magnetic field. Consider light traveling through region 61. The light traveling in the counterclockwise direction will experience an increased index of refraction relative to light traveling in the clockwise direction in this region. However, there is a corresponding region 62 in which light traveling in the counterclockwise direction will experience a decreased index of refraction relative to light traveling in the clockwise direction. As a result, light traveling in each direction will experience an average index of refraction of n, and no asymmetry will be present.

If, however, the magnetic field in region 62 is less than that in region 61, a net difference in the average index of refraction experienced by light traveling in the two directions will be achieved. For example, a magnetic field in which the field points in the same direction and the field strength varies over the microdisk can be utilized. Similarly, a magnetic field having circular field lines can be utilized.

The magnetic field and microdisk size and material are chosen such that the resonance frequency of the microdisk for light traveling in the counterclockwise direction matches the wavelength of the input signal that enters waveguide 13. The passband is chosen such that any reflected signal that enters waveguide 12 in the direction of travel opposite to that of the output signal will not be sufficiently off resonance to block the light from being transferred to the input waveguide. Hence, such reflected signals will exit waveguide 12 through the other end of waveguide 12 and not be transferred to waveguide 13.

The microdisk shown in FIG. 1 may also include a mechanism for fine tuning the resonant frequency of the microdisk to adjust the wavelength of the light that is to be coupled from the input to output waveguides. In principle, the microdisk can be fabricated with dimensions that set the resonance wavelength. However, embodiments in which some tuning mechanism is also included have the advantage of allowing fine-tuning to compensate for any variations in resonance wavelength due to temperature or small fabrication anomalies. For example, a small heating element 17 may be included on the substrate or on the microdisk to adjust the operating temperature of the microdisk. Since the index of refraction of the microdisk material varies with temperature, a change in operating temperature can be utilized to fine-tune the resonant wavelength of the microdisk.

The refractive index can also be fine-tuned by injecting current into an active region in the microdisk. This causes a change in the refractive index due to the free carrier or plasma effect.

The embodiments discussed above with reference to FIG. 1 require the generation of a non-uniform magnetic field in the microdisk resonator. Since the dimensions of the microdisk are small, generating a magnetic field that varies sufficiently over the small dimensions of the resonator can be problematic. Accordingly, embodiments in which the applied magnetic field is substantially uniform provide distinct advantages.

Figure 4:
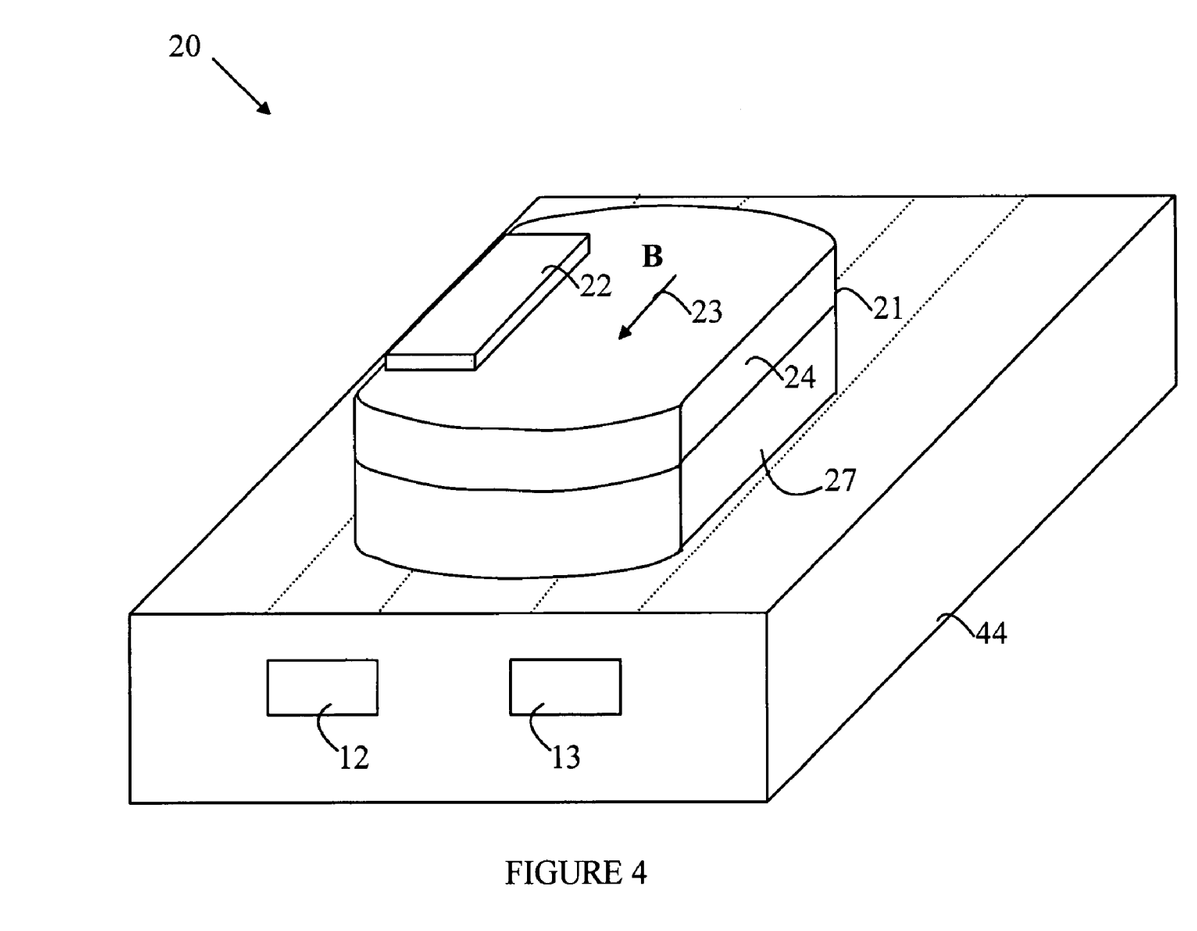
FIG. 4 illustrates an optical isolator according to another embodiment of the present invention in which the applied magnetic field may be a uniform field.

Refer now to FIG. 4, which illustrates an optical isolator 20 according to another embodiment of the present invention in which the applied magnetic field may be a uniform field. In this embodiment, an extended disk resonator 21 having a layer 24 of ferromagnetic optically transparent material, such as the Fe:InP discussed above, is utilized on a substrate 44 having the input and output waveguides. A layer 22 of ferromagnetic metal is deposited on one side of the coupling region. A uniform magnetic field is applied to optical isolator 20 in the direction shown by the arrow at 23. The layer of ferromagnetic metal alters the magnetic field in the region of the layer, and hence, provides the required non-uniformity in the magnetic field.

Another method of generating a non-uniform field is to magnetize the ferromagnetic layer so that the ferromagnetic layer becomes the source of the magnetic field. For example, if a magnetic field is applied to an unmagnetized layer of ferromagnetic material, a magnetization corresponding to the alignment of the ferromagnetic domains in the material will be created. Hence, during fabrication, layer 22 is deposited as an unmagnetized layer. The isolator is then exposed to a magnetic field oriented parallel to the ferromagnetic layer to magnetize the ferromagnetic material. The net magnetization that remains after the applied field is removed depends on the magnetization curve of the ferromagnetic material. Temperature cycling with an applied magnetic field will enhance the magnetization. The net magnetization that is stored in the ferromagnetic material provides a self-generating magnetic field used to provide the Faraday rotation, and hence, the applied field shown at 23 is not needed. It should be noted that this field only exists on the side of the coupling section having layer 22. Another effect of the ferromagnetic material is that under an applied magnetic field the effective refractive index of the waveguide layer is modified through the magneto-optic Kerr effect yielding non-identical propagation constants for clockwise and counterclockwise directions. Ferromagnetic metals such as Iron, Cobalt, Nickel or their alloys may be used for layer 22. The metal layer is preferably deposited on top of a layer of dielectric material.

This extended resonator geometry has the additional advantage of providing parallel boundary segments 27 for the coupling of the light between the resonator and the waveguides. Such an arrangement allows finer control of the bandwidth of the isolator. Accordingly, geometries such as the extended disk geometry that have such parallel boundary segments are preferred. However, the same inclusion of a region of ferromagnetic metal over a portion of the disk can be utilized in a circular microdisk such as shown in FIG. 1 to provide the desired magnetic field conversion. Similarly, an embodiment having the extended disk configuration, but no ferromagnetic metal layer, can be utilized with a non-uniform magnetic field generator to provide the improved control of the light coupling.

The above-described embodiments of the present invention utilize passive waveguides as the input and output waveguides. However embodiments in which one or both of the waveguides have gain sections to compensate for losses in the waveguides and the microresonator can also be constructed. Since the construction of waveguides having such gain sections is known to the art, the details of this type of waveguide will not be discussed in detail here.

The present invention provides a number of advantages over optical isolators based on Faraday rotators. A fabrication process with high yield that is similar to that used for lasers can be utilized. Since long interaction lengths are not required to achieve good optical isolation, the size of the device is substantially reduced. For example, resonators with diameters as small as 5 µm can be utilized. The present invention also does not rely on the traditional TM to TE rotation to provide optical isolation, and hence, does not require polarized light.

Furthermore, an optical isolator according to the present invention can be readily integrated into other microresonator based devices such as single frequency lasers, tunable lasers, modulators, add drop multiplexers etc. yielding a complete integration platform for multifunction photonic integrated circuits.

The above-described embodiments of the present invention utilize a vertical coupling arrangement to couple the microresonator to the waveguides. In such embodiments, the coupling constant is determined by the thickness of the layer between the tops of the waveguides and the bottom of the microresonator. This thickness can be precisely controlled during the fabrication process.

Methods for fabricating a microresonator on top of two waveguides are known to the art and hence, will not be discussed in detail here. For example, a method for constructing a microdisk resonator that is vertically coupled to two waveguides is taught in co-pending U.S. patent application Ser. No. 10/227,000, which is hereby incorporated by reference. Methods that depend on the fusion of two substrates are also known to the art ("High-Q Vertically Coupled InP Microdisk Resonators", by Kostadin Djordjev, Seung-June Choi, Sang-Jun Choi, and P. D. Dapkus, IEEE PHOTONICS TECHNOLOGY LETTERS, 2002, pp. 1–3.

While the preferred embodiment of the present invention utilizes a vertically coupled microresonator, embodiments in which the microresonator is located between the waveguides and in the same plane as the waveguides can also be constructed. Optical switches having this geometry are known to the art, and hence, embodiments having this geometry will not be discussed in detail here. For example, such devices are taught in U.S. Pat. No. 6,052,495, which is hereby incorporated by reference.

Figure 5:
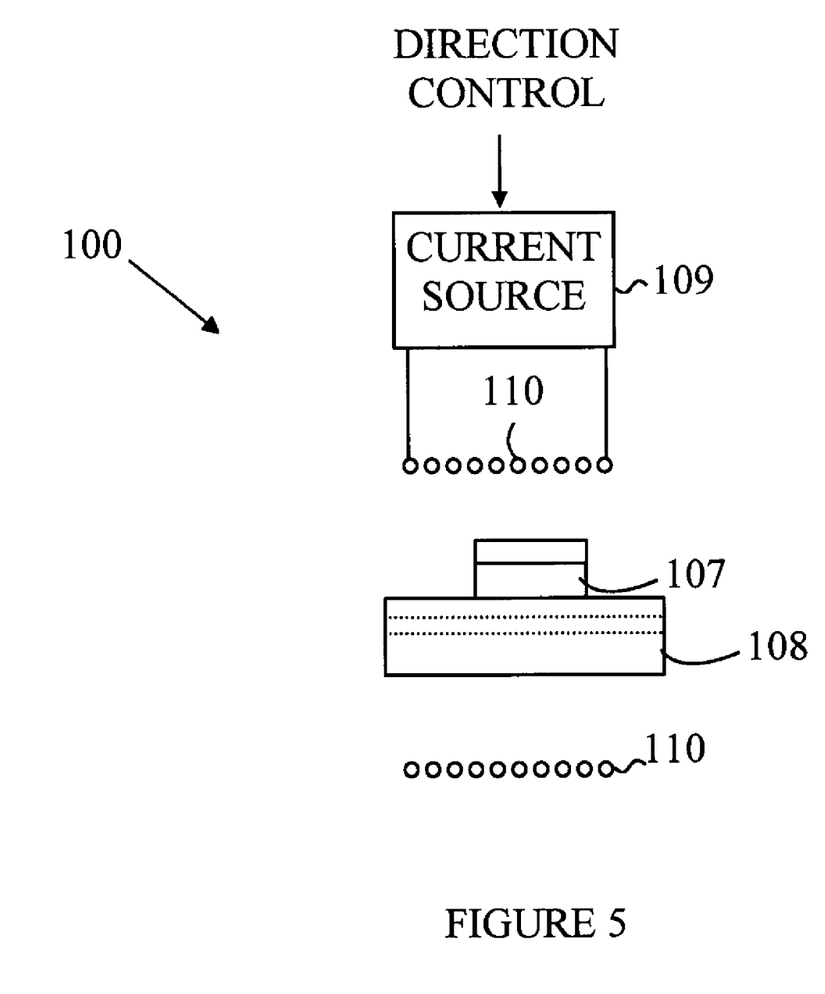
FIG. 5 illustrates an optical isolator according to another embodiment of the present invention.

As noted above, the present invention requires the application of a magnetic field to the microdisk resonator. A permanent magnet or an electromagnet can generate the magnetic field. An electromagnet has the advantage of allowing the pass direction of the isolator to be reversed. Refer now to FIG. 5, which illustrates an optical isolator 100 according to another embodiment of the present invention. Optical isolator 100 includes a substrate 108 having two waveguides and a microdisk resonator 107. Microdisk resonator 107 preferably includes a ferromagnetic metal element similar to the one described above with reference to FIG. 4. The magnetic field used to provide the index of refraction asymmetry is generated by an electromagnet 110 that is powered by current source 109. The direction of the magnetic field is determined by a direction signal that sets the direction of current flow in electromagnet 110. Referring again to FIG. 1, in one field direction, light is passed from waveguide 13 to waveguide 12, and light traveling in the reverse direction is blocked. In the other field direction, light passes from waveguide 12 to waveguide 13, and the light traveling in the reverse direction is blocked.

The above-described embodiment utilizes one magnetic field generator per optical isolator. However, optical circuits in which a number of optical isolators share the same magnetic field generator can also be constructed. Such optical circuits are more easily constructed with embodiments of the present invention that utilize a uniform external magnetic field. In this regard, it should be noted that the direction of travel around the microdisk that corresponds to the pass direction is arbitrary. By altering either the microdisk diameter, the location of the ferromagnetic metal patch, or the index of refraction of the microdisk material, an optical isolator having the reverse pass direction can be obtained while maintaining the same direction for the external applied magnetic field.

The above-described embodiments of the present invention have utilized microresonators with particular geometric configurations, i.e., microdisks and extended microdisks. However, other geometric configurations can be utilized. The above-described embodiments require the creation of sub-micron features. To minimize bend losses, the microdisk resonator requires a large change in the index of refraction between the boundary of the resonator and the surrounding medium. This is accomplished by etching the area around the resonator and waveguide. Unfortunately, this forces the width of the waveguide to be less than 0.5 µm. If the waveguide is wider, the waveguide would support multiple modes. While such structures are within the range of current manufacturing techniques, the cost of the submicron fabrication substantially increases the cost of the modulator. In addition, coupling into these narrow high index contrast waveguides from external optical fibers is difficult due to the different mode sizes. As a result, the coupling loss into the modulator increases.

Figure 6:
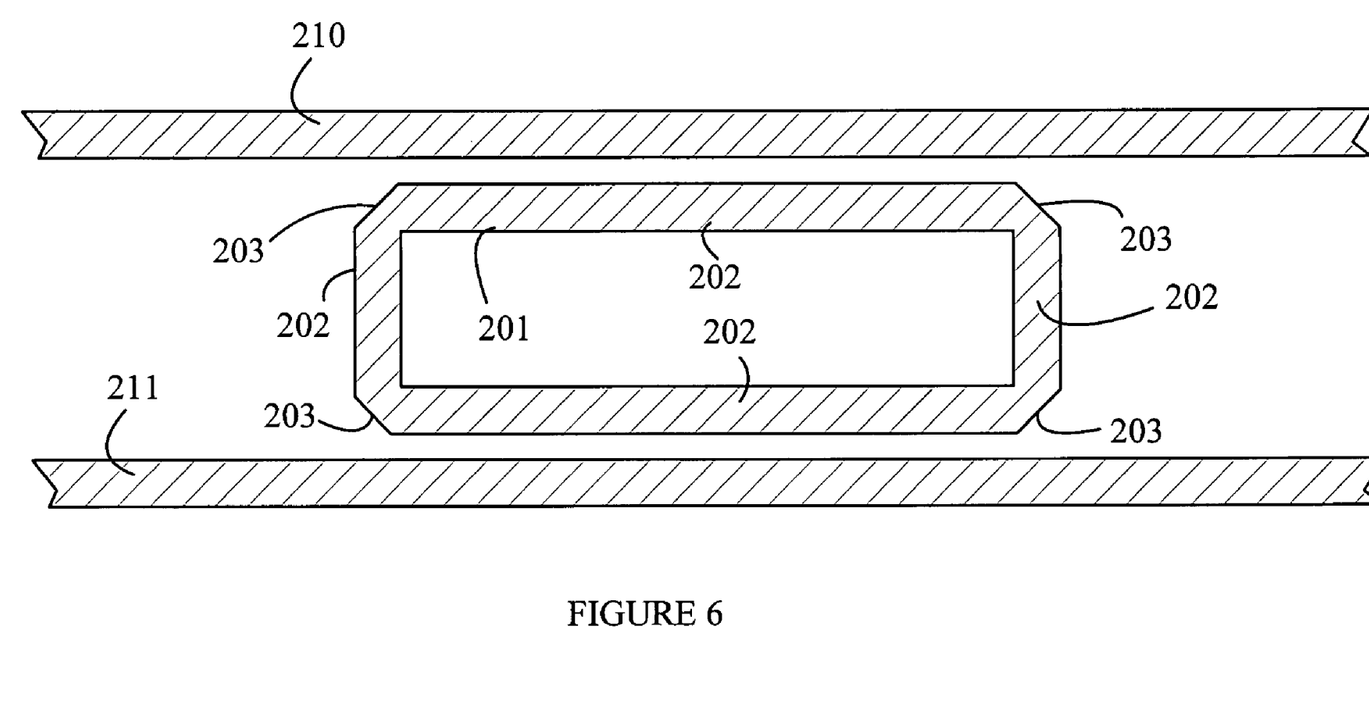
FIG. 6 is a simplified top view of a folded cavity resonator.

Embodiments in which submicron structures are avoided can be constructed by using folded cavity resonators that do not require a large difference in index of refraction. Refer now to FIG. 6, which is a simplified top view of a folded cavity resonator 201 coupled to waveguides 210 and 211 that may be used in place of the extended microdisk structures discussed above. Resonator 201 is constructed from straight waveguides 202 and 90 degree turning mirrors 203. The advantage of this configuration is that low index contrast waveguides may now be utilized, and hence, the maximum waveguide width that will be limited to one mode is much larger. Typically, the waveguide widths are on the order of 1–2 µm for waveguides constructed from Group III–V materials.

Figure 7:
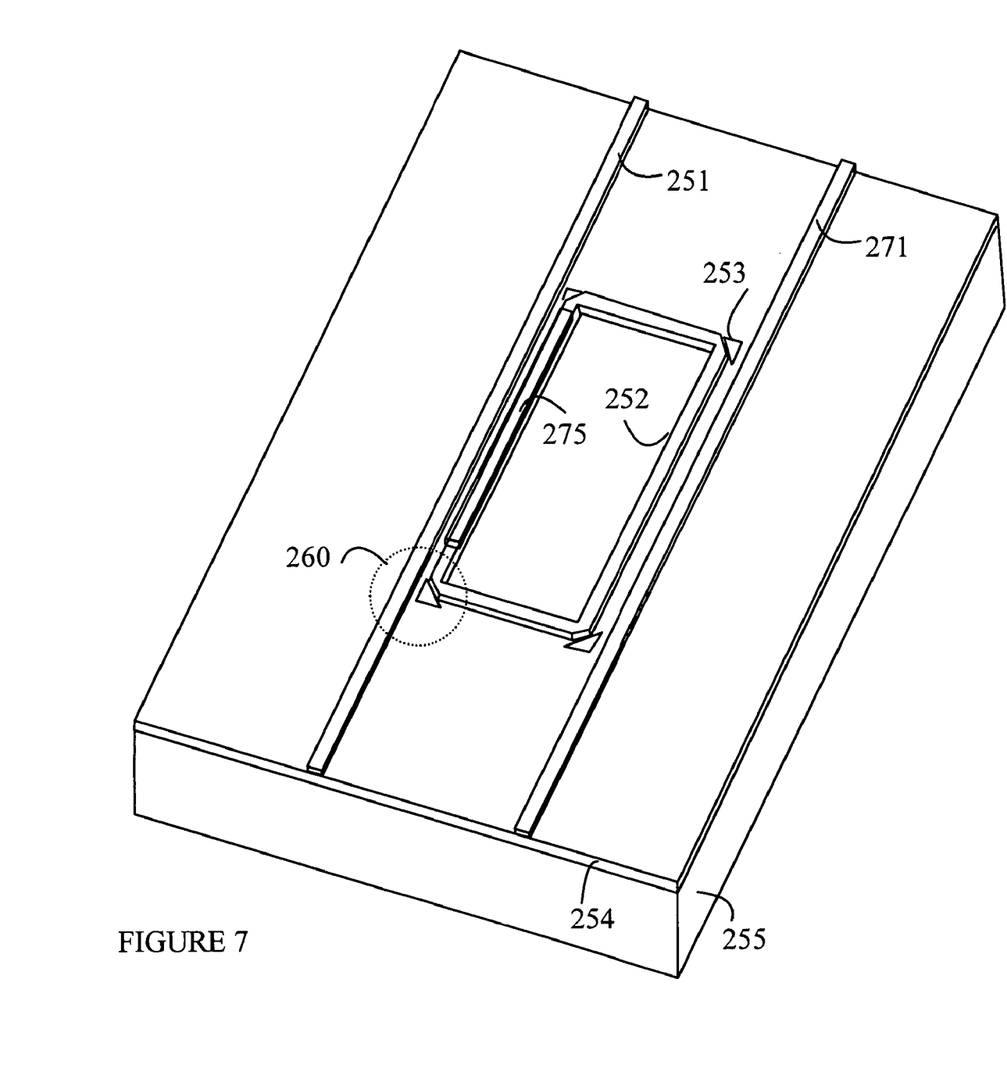
FIG. 7 is a prospective view of a folded cavity resonator coupled to a linear waveguide.
Figure 8:
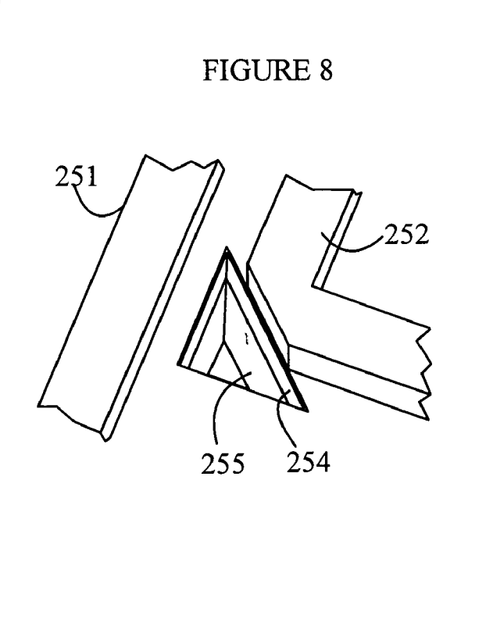
FIG. 8 is a magnified portion of the region of FIG. 7 shown at 260.

Refer now to FIGS. 7 and 8. FIG. 7 is a prospective view of a folded cavity resonator coupled to a linear waveguide. FIG. 8 is a magnified portion of the region of FIG. 7 shown at 260. The resonator is constructed by fabricating a layer that includes the cladding layers for the waveguides on top of a substrate 255, which includes the lower cladding layer. A silicon dioxide layer is deposited on top of these layers. The silicon dioxide layer is then patterned to define the ridge waveguides, 251 and 271, which is formed by etching into the top cladding layer. A similar ridge waveguide 252 is patterned over the region that is to become the folded mirror resonator. The mirrors in the folded mirror resonator are then created by etching holes from the surface of the layered structure through the region 254 and into substrate 255. The surface of this hole provides a boundary having a large change in index of refraction that acts as a turning mirror with a high reflection coefficient, for example, a reflection coefficient greater than 0.9. After formation of the ridge waveguides and turning mirrors, the layer 275 of ferromagnetic material discussed above is deposited on the surface of the folded resonator nearest waveguide 251.

Various modifications to the present invention will become apparent to those skilled in the art from the foregoing description and accompanying drawings. Accordingly, the present invention is to be limited solely by the scope of the following claims.

What is claimed is:

1. An optical isolator comprising:
   a first optical waveguide;
   a second optical waveguide;
   a resonator coupled to said first and second optical waveguides, said resonator having a resonance at λ for light traveling from said first optical waveguide to said second optical waveguide and said resonator not having a resonance at λ for light traveling from said second optical waveguide to said first optical waveguide, wherein said second optical waveguide is configured to transport optical signals to and from said resonator, and wherein said first optical waveguide, said second optical waveguide, and said resonator operate as an optical isolator for preventing signals transferred from said first optical waveguide to said second optical waveguide from returning to said first optical waveguide.

2. An optical isolator comprising:
   a first optical waveguide;
   a second optical waveguide;
   a resonator coupled to said first and second optical waveguides, said resonator having a resonance at λ for light traveling from said first optical waveguide to said second optical waveguide and said resonator not having a resonance at λ for light traveling from said second optical waveguide to said first optical waveguide,
   wherein said resonator comprises a microdisk resonator.

3. An optical isolator comprising:
   a first optical waveguide;
   a second optical waveguide;
   a resonator coupled to said first and second optical waveguides, said resonator having a resonance at λ for light traveling from said first optical waveguide to said second optical waveguide and said resonator not having a resonance at λ for light traveling from said second optical waveguide to said first optical waveguide,
   wherein said resonator comprises a folded cavity resonator comprising a plurality of linear segments joined by mirrors.

4. An optical isolator comprising:
   a first optical waveguide;
   a second optical waveguide;
   a resonator coupled to said first and second optical waveguides, said resonator having a resonance at λ for light traveling from said first optical waveguide to said second optical waveguide and said resonator not having a resonance at λ for light traveling from said second optical waveguide to said first optical waveguide,
   wherein said second optical waveguide is configured to transport optical signals to and from said resonator, and wherein said first optical waveguide, said second optical waveguide, and said resonator operate as an optical isolator for preventing signals transferred from said first optical waveguide to said second optical waveguide from returning to said first optical waveguide.
wherein said resonator comprises an edge that is parallel to an edge of said first optical waveguide.

5. An optical isolator comprising:
a first optical waveguide;
a second optical waveguide;
a resonator coupled to said first and second optical waveguides, said resonator having a resonance at $\lambda$ for light traveling from said first optical waveguide to said second optical waveguide and said resonator not having a resonance at $\lambda$ for light traveling from said second optical waveguide to said first optical waveguide.
wherein said resonator comprises a layer of ferromagnetic material in an applied magnetic field.

6. The optical isolator of claim 5 wherein said ferromagnetic material comprises Fe:InP.

7. The optical isolator of claim 5 wherein said ferromagnetic material has a net magnetization which generates a B field along the direction of propagation of the light signal around the micro resonator.

8. The optical isolator of claim 5 wherein a net magnetization is created in said ferromagnetic material.

9. The optical isolator of claim 5 wherein said applied magnetic field varies in intensity or direction over said layer of ferromagnetic material.

10. The optical isolator of claim 5 further comprising a magnetic field generator for generating said applied magnetic field.

11. The optical isolator of claim 10 wherein said applied magnetic field has a direction that is selectable by a control signal.

12. An optical isolator comprising:
a first optical waveguide;
a second optical waveguide;
a resonator coupled to said first and second optical waveguides, said resonator having a resonance at $\lambda$ for light traveling from said first optical waveguide to said second optical waveguide and said resonator not having a resonance at $\lambda$ for light traveling from said second optical waveguide to said first optical waveguide; and
wherein said resonator comprises a layer of ferromagnetic material in an applied magnetic field; and
wherein said resonator further comprises another layer of a ferromagnetic metal overlying a portion of said layer of ferromagnetic material, and wherein said applied magnetic field is constant in direction and magnitude over said layer of ferromagnetic material, said portion being less than all of said layer of ferromagnetic material.

13. An optical isolator comprising:
a first optical waveguide;
a second optical waveguide;
a resonator coupled to said first and second optical waveguides, said resonator having a resonance at $\lambda$ for light traveling from said first optical waveguide to said second optical waveguide and said resonator not having a resonance at $\lambda$ for light traveling from said second optical waveguide to said first optical waveguide,
wherein said first waveguide and said second waveguide are located in a planar substrate and wherein said resonator overlies said first and second waveguides and is vertically coupled to said first and second waveguides.

* * * * *

UNITED STATES PATENT AND TRADEMARK OFFICE
CERTIFICATE OF CORRECTION

PATENT NO. : 7,215,848 B2 Page 1 of 1
APPLICATION NO. : 10/768858
DATED : May 8, 2007
INVENTOR(S) : Michael Tan It is certified that error appears in the above-identified patent and that said Letters Patent is hereby corrected as shown below:

Col. 9 Line 3 In Claim 4, after "waveguide" delete "." and insert -- , --, therefor.

Col. 9 Line 14 In Claim 5, after "waveguide" delete "." and insert -- , --, therefor.

Col. 9 Line 23 In Claim 7, delete "micro resonator" and insert -- microresonator --, therefor.

Signed and Sealed this

Sixteenth Day of December, 2008

JON W. DUDAS
*Director of the United States Patent and Trademark Office*